US012620307B2

(12) United States Patent
Vail

(10) Patent No.: US 12,620,307 B2
(45) Date of Patent: May 5, 2026

(54) DEVICE TO WARN TRAFFIC REGARDING THE PRESENCE OF CHILDREN

(71) Applicant: Jay Vail, Jacksonville, FL (US)

(72) Inventor: Jay Vail, Jacksonville, FL (US)

( * ) Notice: Subject to any disclaimer, the term of this patent is extended or adjusted under 35 U.S.C. 154(b) by 0 days.

(21) Appl. No.: 18/897,600

(22) Filed: Sep. 26, 2024

(65) Prior Publication Data

US 2026/0087929 A1 Mar. 26, 2026

(51) Int. Cl.
*G08G 1/0955* (2006.01)
*G08G 1/16* (2006.01)

(52) U.S. Cl.
CPC ........... *G08G 1/0955* (2013.01); *G08G 1/166* (2013.01)

(58) Field of Classification Search
CPC ............................ G08G 1/0955; G08G 1/166
See application file for complete search history.

(56) References Cited

U.S. PATENT DOCUMENTS 6,104,313 A * 8/2000 Boyd, II .................. E01F 9/65 340/925
6,243,644 B1 * 6/2001 Dengler .................. G08G 1/01 340/933
2005/0062616 A1 * 3/2005 Vernon-Dier .......... G08B 5/006 340/908
2007/0290886 A1 * 12/2007 Stam ...................... G08G 1/052 340/907
2013/0049994 A1 * 2/2013 Nicholson .............. G08G 1/052 340/936
2014/0070963 A1 * 3/2014 DeLorean .............. B60Q 1/545 340/917
2016/0379492 A1 * 12/2016 Roy .......................... G01S 7/04 340/907

* cited by examiner

*Primary Examiner* — Nay Tun
(74) *Attorney, Agent, or Firm* — Lawrence J. Gibney

(57) ABSTRACT

It is important to warn children about the presence of vehicular traffic in an area to protect the child. Children thrive when they are outside but the dangers of vehicles is a real threat. A portable device that can be erected outside but moved from location to location is provided that will have software that will control lights, cameras, and an audible alarm is provided. The device will be linked to the parent's portable electronic device. A link to first responders is also provided.

5 Claims, 2 Drawing Sheets

DEVICE TO WARN TRAFFIC REGARDING THE PRESENCE OF CHILDREN

BACKGROUND OF THE INVENTION

A. Field of the Invention

This device is designed to protect children, and specifically when children are playing outside, especially when they may be exposed to traffic. Children may find themselves in roads or streets and may be exposed to danger unwittingly, or unknowingly. The device should be constructed of durable material that can withstand extreme environmental conditions and is primarily used to alert the driver of the vehicle. The device is designed to be portable.

B. Prior Art

There are many other prior art references that teach to warning devices to alert children who are playing, one is the ubiquitous plastic depiction of a small child with a warning flag. This device does not use any electronics and does not use any modern technology. While it has some advantages, it does not have the full advantage of the current application and does not incorporate or teach the features of the device.

Another device that uses wireless technology to detect objects is found at Schuk, U.S. Pat. No. 8,659,414. The Schuk reference teaches a device to detect objects that are in proximity to a given object. This does not specifically use the technology to detect traffic in the area.

Another example that can be found in the prior art is found at Adam, U.S. Pat. No. 10,569,707, which is a device that teaches an emergency warning system for warning vehicles.

There are many other prior art references that teach warning systems but none incorporate the features that are claimed in the present application.

BRIEF SUMMARY OF THE INVENTION

The device is designed to be portable and moved from place to place depending on the needs of the user. The electronic warning device is likely to be made of durable material that can withstand extremes in temperatures and all environmental conditions. In operation the device will be used to alert drivers of cars in the area that children may be present while at the same time alerting children to the presence of cars and other forms of traffic. While the presence of cars will be discussed in this application, the application can be used in any situation where other types of vehicles (motorcycles, mopeds, bikes) of any kind is present.

The device can also be anchored to the ground with stakes and a removable sign can be placed on the top of the device to advertise an event such as "Open House" or "Garage Sale"; the sign that is placed above the device can be connected to the means of illumination if desired. No specific type of stake is claimed in this invention.

The device will depict a visual warning such as "Slow, Children at Play" to the approaching traffic. In addition to the visual warning the device will be equipped with a plurality of lights on the device to warn drivers. When traffic is approaching and depending on the presets of the software, the lights may illuminate or flash as an additional warning to the vehicle driver. The lights may different colors to depict different situations; some possible color combinations may include red, amber and green.

Cameras are installed on the device to record surrounding events or surrounding traffic movement for later use. The cameras will be linked to a parent's portable electronic device to provide a visual image of the outside environment.

A plurality of motion sensors are installed on the device to detect the presence of a moving vehicle. The vehicle can include a car, motorcycle, and bicycle. The sensors will have the ability to distinguish between a moving vehicle such as a car, truck, bicycle, or moped to name a few examples and a stationary object that may sway in the wind, such as a tree limb.

Audible alarms are incorporated into the device to alert the driver to the presence of children in the area and at the same time alert the children to the presence of a vehicle in the vicinity.

A power source will be provided. This may consist of a cord or solar panel or a rechargeable battery.

This maya also be coordinated with the technology involved in the car to alert the driver through the radio or other means. Additionally, this may be monitored by the parent or guardian through an application on someone's portable electronic device.

NUMBERING REFERENCE

Figure 1:
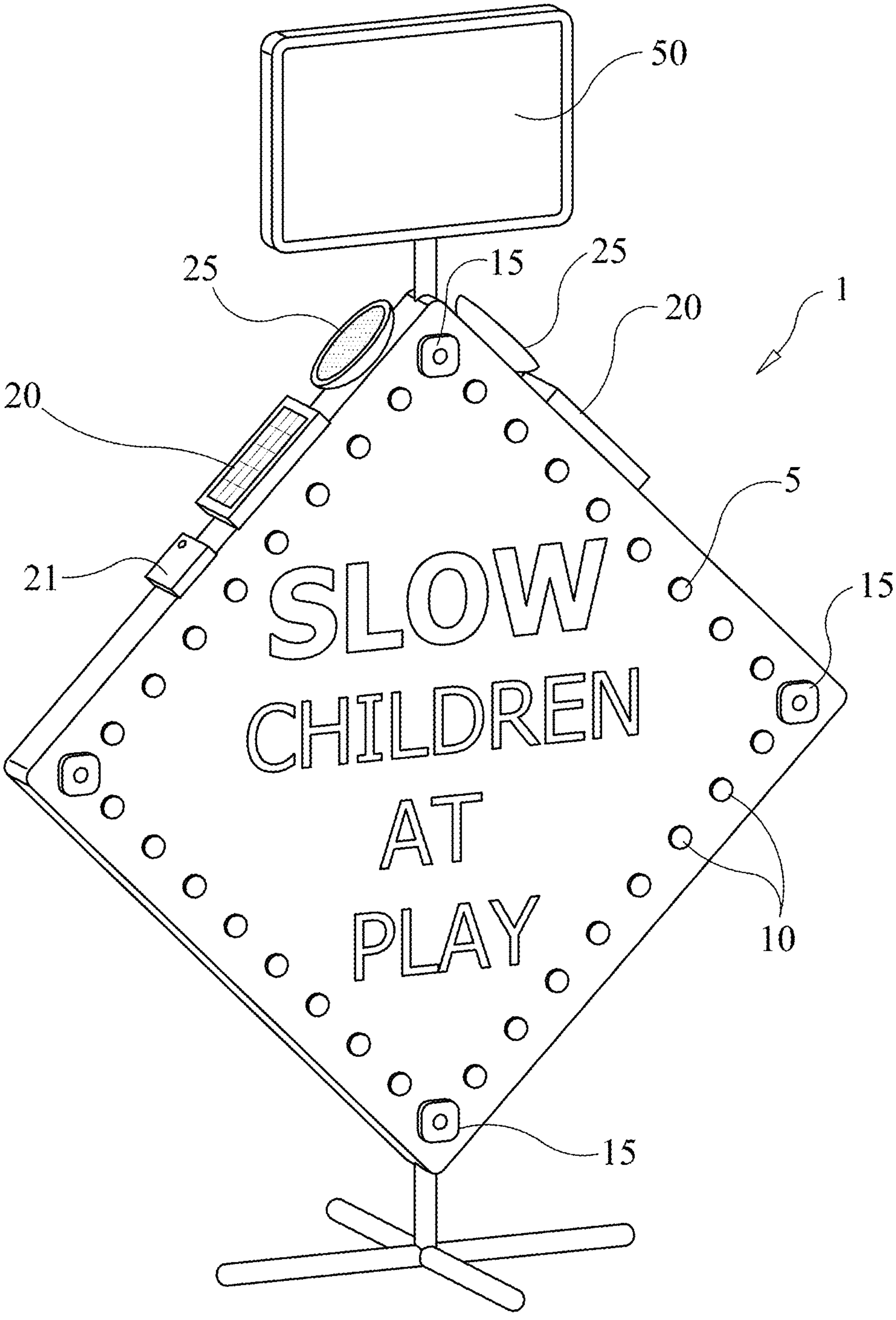
FIG. 1 is a perspective view of the device
Figure 2:
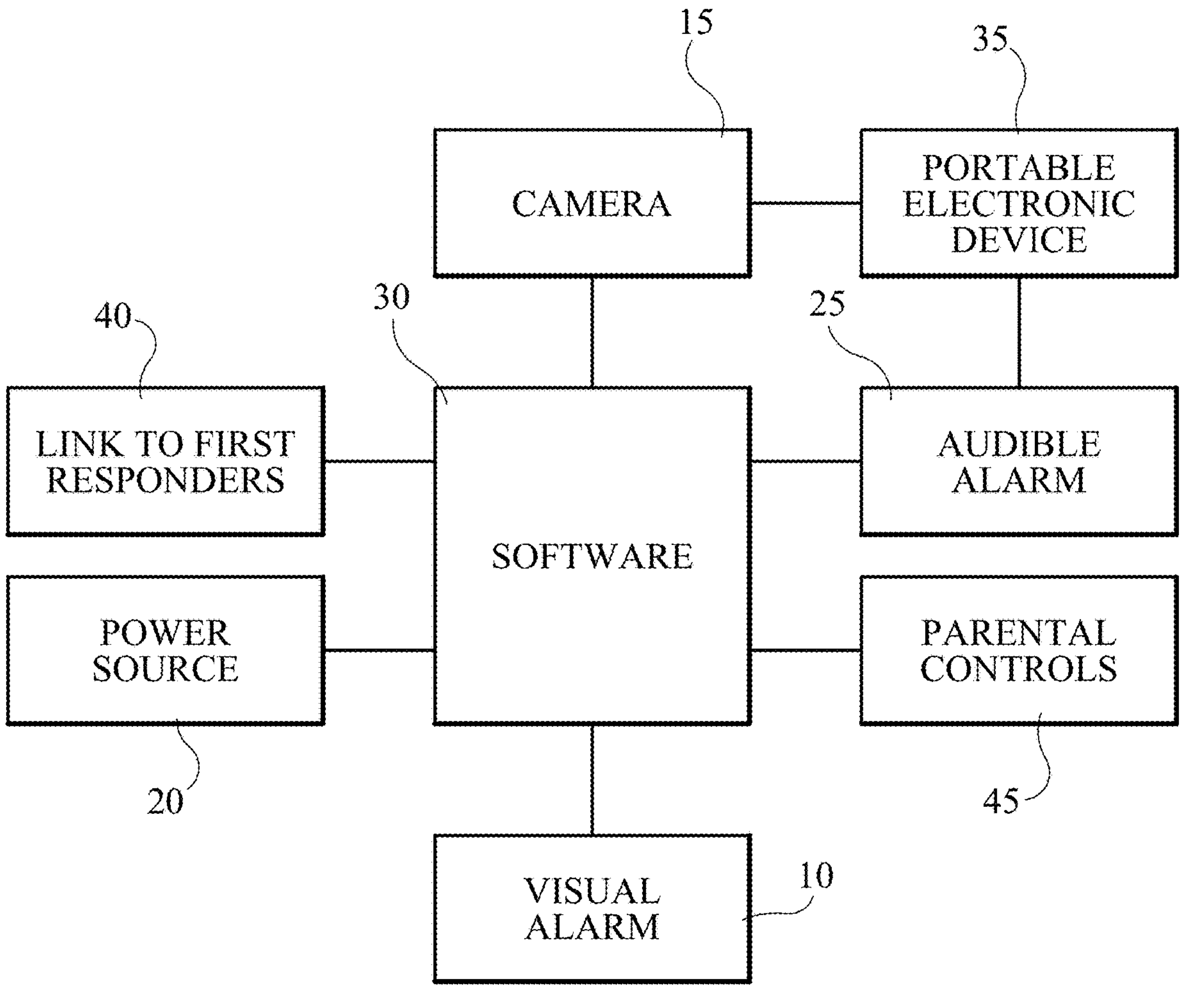
FIG. 2 is a schematic of the components of the device

1—Device
5—Panel
10—Lights
15—Camera
20—Power source
21—Battery
25—Speaker
30—Software
35—Portable Electronic Device
40—Link to First Responders
45—Parental Controls
50—Marquee

DETAILED DESCRIPTION OF THE EMBODIMENTS

The device 1, will be made of durable material that can withstand all environmental conditions. On the front of the device will be wording which will alert the drivers to the possible presence of children in the area. Phrases such as "slow children at play" are appropriate for this type of device. The device can be in multiple shapes: square, circular, rectangular, or triangular to name a few. The device 1 will have a front surface and a back surface. Because this is a device to warn drivers it should be bright and visible; a variety of colors such as bright yellow or orange may be the color of choice. The caution yellow may be a preferred color to illuminate the device.

The device 1 is designed to be portable and will likely have a stand or a way to stake the device at the bottom of the device. No specific stand or stake is being claimed in this application.

A separate removable sign 50 may be placed on the top of the device and can be used to advertise an event or services. For example the sign 50 may be used to advertise an "Open House" in the area or an "Estate Sale". The specific wording on the sign 50 will be decided by the user of the device; the sign may also connect to the means of illumination for the original device.

A plurality of lights, 10 will be provided around the perimeter of the device on both the front side and the back side of the device. The lights 10 will be brightly illuminated and provide a visual alert for oncoming traffic. The lights may be a variety of colors but regardless of the specific choice of color the lights should brightly illuminate the area. The user may decrease or increase the intensity of the lights depending on a given situation. When traffic is approaching and depending on the speed of the approaching traffic, the illumination of the lighting may increase in intensity. Additionally, the lights may flash or create a strobe effect to warn oncoming traffic. The caution yellow light is probably an ideal choice for the illumination on the device.

A plurality of cameras 15 will be positioned on the front and back surface of the device. The cameras will capture images of the traffic in the area and provide that image to the portable electronic device 35 that is carried by the parent or guardian. The plurality of cameras 15 will have the ability to record events and store those images, if necessary.

Certain parental controls, 45, may be incorporated in the system. These parental controls may enable the parent to correctly link the device with his or her portable electronic device and provide an alarm and/or instructions to children in the area. The parental controls 45 may allow the parent to override the system if needed.

Additionally, there will be audible alarms or speakers, 25, which are attached to the device. These speakers will be able to carry spoken messages from the parent or guardian and provide an audible alarm in the event of oncoming traffic, which is deemed to be traveling at excessive speeds. The noise from the audible alarms or speakers may vary in intensity or frequency depending on the presets of the software.

A link will be provided for the parent to be physically removed from the child and still view the child on the portable electronic device. If the parent is in the kitchen preparing dinner, for instance, and sees an alarming event (cars speeding, children too close to the road, etc.) the parent has the ability to send a message to the child through the speakers to warn the child and also inform the others in the area. By taking this action the parent has overridden the system and sent a warning.

A power source will be included. Certain power sources may include a solar panel, 20, or may include a cord which will be plugged into the outlet of a home or a business. A separate battery 21 may also be used to provide power to the device 1.

Software, 30, will control all the functions of this device including the illumination of the lights 10, the activation of the plurality of the cameras 15, the activation of the audible alarm and the parental controls 45. The software 30 also provides a link to first responders in the event assistance from first responders is necessary. The link to first responders, 40, is likely to be a wireless connection and can automatically dial certain emergency numbers such as 911 in the event based on the presets of the software. The software will also have the feature to automatically dial the first responders. For instance, if a child is struck by a car, the system will automatically dial the first responders and let the parent tend to the child and not worry about dialing an emergency number.

The parent or guardian while he or she may be removed from the physical presence of the child may be able to monitor the activities of the child through the screen of his portable electronic device, 35, which has been paired or linked to the device. The portable electronic device can include a cell phone, iPad or tablet.

While the embodiments of the invention have been disclosed, certain modifications may be made by those skilled in the art to modify the invention without departing from the spirit of the invention.

The inventor claims:

1. An electronic warning device to alert drivers to the presence of children, which is comprised of: the device, wherein the device has a front side and a back side, a removable sign, wherein the removable sign is secured to the top of the device, a means of illumination, wherein the means of illumination consists of a plurality of lights, wherein the plurality of lights is placed on the front side and the back side of the device, a plurality of cameras, wherein the plurality of cameras is placed on the front side and the back side of the device, wherein the images from the plurality of cameras are configured to be viewed on a portable electronic device, a plurality of audible alarms, wherein the plurality of audible alarms is secured to the device, wherein the noise from the audible alarms varies vary in intensity, wherein the noise from the audible alarms varies vary in frequency, software, power source, parental controls, wherein the parental controls provide an override, wherein the plurality of audible alarms include speakers which carry spoken messages from a parent and provide an audible alarm in the event of oncoming traffic traveling at an excessive speed;

a link to first responders, wherein the link to the first responders is a wireless connection;

wherein the link automatically dials a number for the first responders based on presets that are contained in the software.

2. The electronic warning device to alert drivers to the presence of children as described in claim 1 wherein the plurality of lights are flashing.

3. The electronic warning device to alert drivers to the presence of children as described in claim 1 wherein the plurality of lights are yellow.

4. The electronic warning device to alert drivers to the presence of children as described in claim 1 wherein the plurality of lights vary in intensity.

5. The electronic warning device to alert drivers to the presence of children as described in claim 1 wherein the removable sign is connected to the means of illumination of the device.

* * * * *